United States Patent [19]

Matsumoto

[11] 4,139,257
[45] Feb. 13, 1979

[54] SYNCHRONIZING SIGNAL GENERATOR

[75] Inventor: Kazuya Matsumoto, Yokohama, Japan

[73] Assignee: Canon Kabushiki Kaisha, Tokyo, Japan

[21] Appl. No.: 835,783

[22] Filed: Sep. 22, 1977

[51] Int. Cl.² .............................................. G02B 27/17
[52] U.S. Cl. ..................................... 350/6.1; 358/199
[58] Field of Search ............................... 350/6.1–6.91,
350/6.6, 6.7, 6.8, 285, 319, 171, 162 R, 316;
358/208, 199, 225; 331/94.5 K; 356/106 S, 171,
213; 250/160 R, 235, 236; 354/199, 224

[56] References Cited
U.S. PATENT DOCUMENTS

| | | | |
|---|---|---|---|
| 3,090,279 | 5/1963 | Chisholm | 356/111 |
| 3,531,183 | 9/1970 | Aagard | 350/160 R |
| 3,549,239 | 12/1970 | Brienga et al. | 356/111 |
| 3,614,205 | 10/1971 | Whitman | 350/171 |
| 3,733,979 | 7/1971 | England | 350/6 |
| 3,836,257 | 9/1974 | Matsumoto | 356/111 |
| 3,848,087 | 11/1974 | Carrol | 350/7 |
| 3,881,802 | 5/1975 | Helava | 350/6 |
| 3,891,321 | 6/1975 | Hock | 356/111 |
| 4,002,830 | 1/1977 | Brown et al. | 358/293 |
| 4,024,341 | 5/1977 | Takahashi | 358/206 |

Primary Examiner—Paul A. Sacher
Assistant Examiner—B. Wm. de los Reyes
Attorney, Agent, or Firm—Fitzpatrick, Cella, Harper & Scinto

[57] ABSTRACT

In a device wherein a scanning beam from a light source is deflected by a light deflector, especially a rotatable polygonal mirror or a vibratory mirror and focused by an optical element such as a lens or the like to optically scan a surface to be scanned, thereby effecting writing and display of information, a synchronizing signal generator includes an optical system for taking out part of the scanning beam as a synchronizing beam for providing synchronism of signals in scanning. In this device, a diffraction element such as a diffraction grating or the like serving as a beam splitter for splitting the deflected beam to obtain the synchronizing beam is disposed within the deviation range of the deflected beam, and the diffracted beam exiting from the diffraction element is directed to a photodetector so as to provide a synchronizing signal. In this device, the use of the diffraction element as the beam splitter permits a wide area of the scanning beam to be split by a relatively thin member.

17 Claims, 11 Drawing Figures

SYNCHRONIZING SIGNAL GENERATOR

BACKGROUND OF THE INVENTION

1. Field of the Invention

This invention relates to a synchronizing signal generator having an optical system for splitting a synchronizing signal beam from a scanning beam and for detecting the same.

2. Description of the Prior Art

When a modulated light beam is caused to scan by a rotatable polygonal mirror or a vibratory mirror, the positioning of each scanning line usually offers a problem. Particularly, in the case of a rotatable polygonal mirror, poor division precision of each reflecting surface would cause the position of signal on each scanning line to be varied with respect to the scanning direction in accordance with the angular error of the reflecting surface. This problem would become serious when display or writing of high-quality images are to be effected. To avoid such problem, elimination of the angular errors in the polygonal mirror would occur to mind as an available method, but where the number of the reflecting surfaces is great, it would extremely difficult to make them with high precision. It is in this context that a method of regularizing the start point of the synchronizing signal for each scan becomes necessary.

In the apparatus of the prior art, as shown in FIG. 1 of the accompanying drawings, the light from a laser oscillator 1 is subjected to light-modulation corresponding to a signal by a light modulator 2 controlled by a driving system 11, and has the beam diameter thereof expanded by a beam expander 3, and then the beam is caused to scan by a rotatable polygonal mirror 4.

The light beam deflected is focused on a recording surface 6 by a focusing lens 5. Part of the light beam is reflected as a timing beam by a mirror 7 and focused on the surface of a knife edge 9 disposed in front of a photoreception element 8. The timing beam is adapted to enter the photoreception element 8 earlier than it enters the recording surface, in one scan of the scanning image effected by the rotatable polygonal mirror 4.

After having passed through the focusing lens 5, the timing beam passes through the knife edge 9 into the photoreception element 8, whereupon a detector 10 detects the rising of the photoreception element 8 and then a counter starts counting the clock pulse. When a predetermined count has been reached, a driving circuit 11 starts operating to feed signals corresponding to one scan successively into the light modulator 2. By such operation being repeated for each surface of the polygonal mirror, the irregularities of the divided surface are brought into accord to enable display or recording of images having regularized heads.

However, such a method of providing synchronism by disposing the photoreception element on the same plane as the focal plane involves the necessity of providing a great angle of view of the focusing lens 5. In some cases, the photoreception element for providing the timing can not be disposed on the focusing plane. Particularly, in the case of microphotography wherein micropatterns are written in, it is difficult to dispose the photoreception element very closely adjacent to the writing surface, and it is also difficult to take out a timing light beam by the use of a mirror 7 because the distance between the lens 5 and the writing surface is small. For such a case, it would occur to mind to place a beam splitter 12 between the deflector 4 and the writing lens 5 and utilize as the timing light beam the light beam split by the beam splitter 12. A requirement imposed on such beam splitter is that it must be a thinnest possible element in order to minimize the distance between the deflector 4 and the lens 5. However, the thinness of the element leads to a small diameter of the split light beam, with a result that the spot image formed through a focusing lens 13 for timing is enlarged and the accuracy of the timing signal produced by the photoreception element 15 is reduced. It is therefore desired that the element be a thin splitter and yet be capable of splitting the whole of the timing beam to be split.

SUMMARY OF THE INVENTION

It is therefore an object of the present invention to provide, in a device for taking out a synchronizing signal beam by the use of a beam splitter disposed within the angle of deviation of a scanning light beam, a synchronizing signal generator having an optical system for detecting the synchronizing signal which is a beam splitter comprising a thin member and yet is capable of splitting a scanning beam of wide cross-sectional area.

This object may be achieved by employing, as the beam splitter, a diffraction element such as diffraction grating or the like.

It is another object of the present invention to provide a synchronizing signal generator having such a beam splitter that the direction of exit of the synchronizing signal beam split by the beam splitter is maintained in a predetermined relationship with the direction of entrance of the beam into the beam splitter.

Such object may be achieved by causing the synchronizing signal beam diffracted by the aforementioned diffraction grating to be reflected an even number of times in the base of the diffraction grating comprising parallel surfaces, and by disposing a diffraction grating identical to the diffraction grating on the entrance surface of the beam splitter to thereby take out the synchronizing signal beam.

It is still another object of the present invention to provide a synchronizing signal generator having a beam splitter which splits the scanning beam only when the deflected beam is deflected to the timing angle and which is entirely transparent for any other angle of deflection with resultant zero split beam. This object may be achieved by employing a volume type hologram as the beam splitter.

It is a further object of the present invention to provide a synchronizing signal generator in which the optical system for enhancing the resolving power may be eliminated. This object may be achieved by employing a volume type hologram of sharp directivity as the beam splitter.

DESCRIPTION OF THE PREFERRED EMBODIMENT

Figure 1:
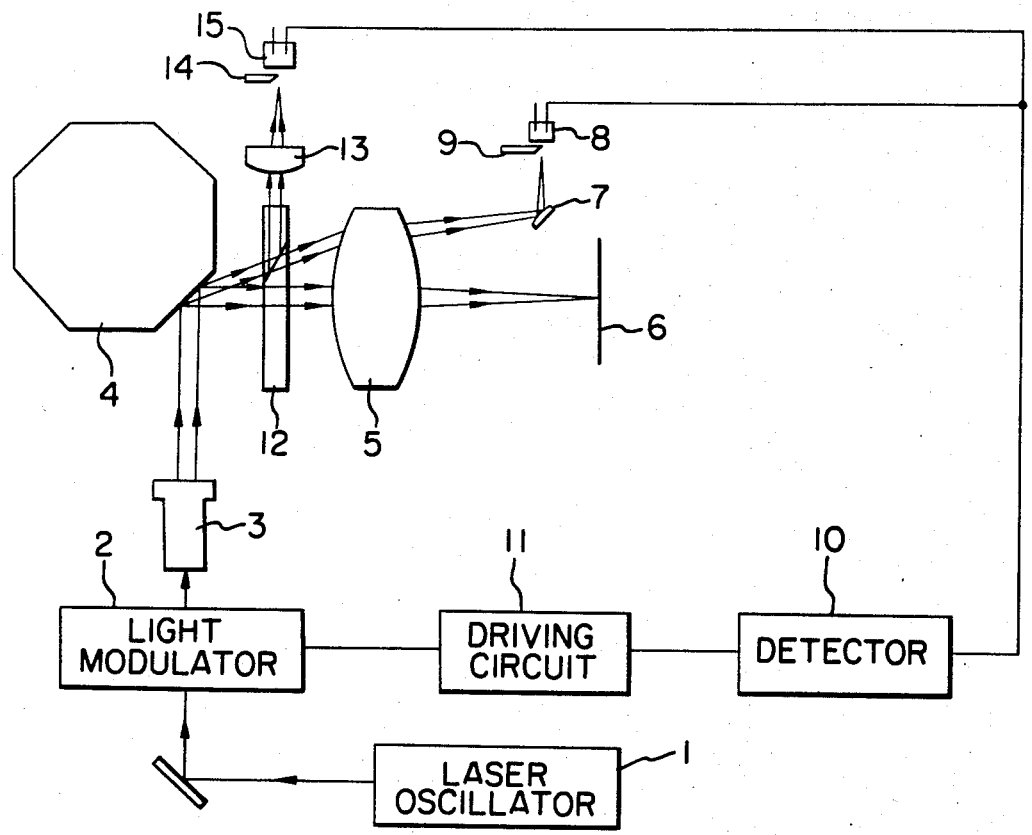
FIG. 1 shows the optical arrangement of a laser beam printer to which the synchronizing signal generator of the prior art is applied.
Figure 2:
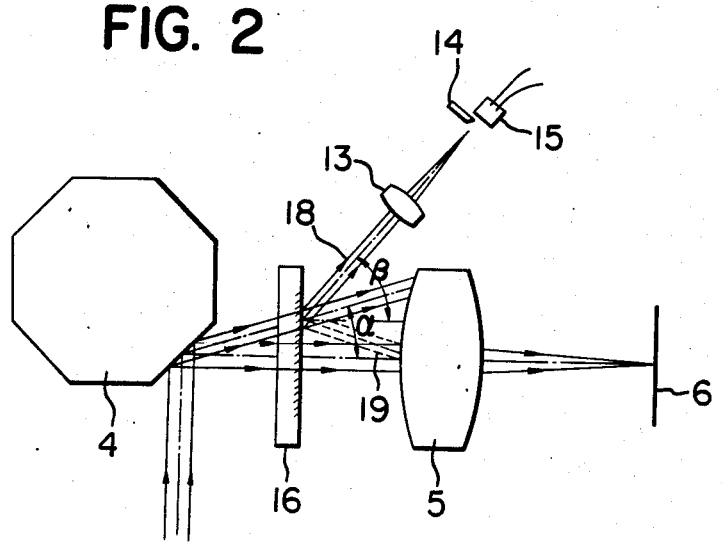
FIG. 2 shows the optical arrangement of a laser beam printer to which the synchronizing signal generator of the present invention is applied.

Reference is first had to FIG. 2 to describe the splitter of the present invention.

In the light beam scanning optical system shown in FIG. 2, a diffraction grating 16 is disposed between the deflector 4 and the focusing lens 5. This diffraction grating may desirably be the so-called phase type one in which the grating structure is formed either by varying concavo-convexity of the surface or by varying refractive index. A first embodiment in which the direction of the grating lines is orthogonal to the scanning direction will first be described with reference to FIG. 3. The light beam having impinged on the diffraction grating 16 is split into three beams, i.e. rectilinearly propagating beam 17, plus primary diffracted beam 18 and minus primary diffracted beam 19. The direction of diffration of the primary diffracted light is given by $$\beta = \sin^{-1}(\lambda/P + \sin\alpha) \quad (1)$$

where $\lambda$ represents the wavelength of the incident light, P the pitch of the grating lines, and $\alpha$ the angle of incidence of the light beam.

The diffracted beam 18 is focused on the knife edge 14 by the lens 13 in FIG. 2, and the variation in quantity of light is detected by the photoreception element 15 disposed behind the knife edge, whereby a timing signal is obtained.

Figure 3:
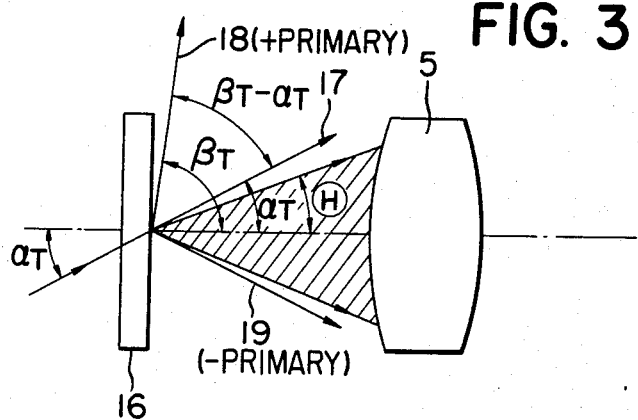
FIG. 3 is an enlarged view showing a diffraction grating and the focusing lens of FIG. 2.

A feature of the beam splitting system using such a diffraction grating is that since the light split takes place in a plane perpendicular to the optic axis, a wide area of light split is possible whether the thickness of the splitter is great or small. If the angle of diffraction $\beta$ of the diffraction grating is small, the diffracted beam is focused on the writing surface to provide a noise. To avoid this, the following condition should be satisfied:

$$\beta_T \geq \text{\textcircled{H}} + 2\alpha_T(\alpha_T \geq \text{\textcircled{H}}) \quad (2)$$

where $\beta_T$ represents the diffraction of the timing beam for the angle of incidence $\alpha_T$ and \textcircled{H} represents the maximum scanning angle necessary for the writing. This equation is derived from the condition under which the minus primary diffracted light 19 is not incident on the writing surface when the light beam 17 is deflected to the timing angle as shown in FIG. 3.

For example, when \textcircled{H} = 15° and $\alpha_T$=16°, $\beta_T$ is 47° or greater, and the pitch of the diffraction grating providing such a diffraction angle may be 1.38 μm or less when $\lambda$=0.6328 μm, as seen from equation (1).

Figure 4:
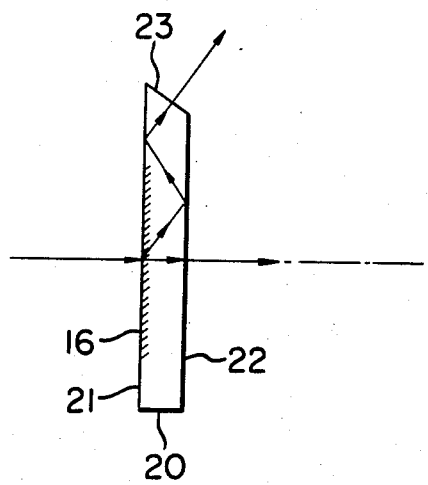
FIGS. 4 and 5 respectively show further forms of diffraction grating different from that of FIG. 2.

Another method of preventing the diffracted light from impinging on the writing surface is to set the condition of the diffraction grating such that the diffracted light is totally reflected within the hologram base for the entire scanning angle. Where the diffraction grating is one such as the blazed grating or the volume type grating which diffracts only one diffracted wave, such condition is given by $$P \geq n\lambda \quad (3)$$

where n represents the refractive index of the hologram base. This equation is derived from the condition under which the diffracted wave for a light beam having zero angle of deviation is totally reflected within the hologram base.

Where equation (3) is satisfied, the diffracted wave by the diffraction grating 16 is totally reflected by the entrance 21 and the exit surface 22 of the base 20 without exiting from these surfaces, as shown in FIG. 4. Thus, the diffracted wave does not reach the writing surface. The light beam totally reflected by the surfaces 21 and 22 of the base exits outwardly through the other surface 23 and it may be utilized as the timing beam.

Figure 5:
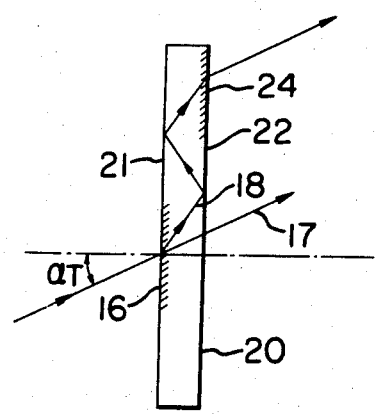

The light beam totally reflected within the base 20 may also be taken out as the diffracted wave from the diffraction grating even if a diffraction grating 24 identical to that provided on the entrance surface 21 is provided on a portion of the exit surface 22, as shown in FIG. 5. In the embodiment of FIG. 5, the angle of incidence of the scanning beam on the splitter 20 equals the angle of emergence of the diffracted light and so, the diffracted light exiting from this splitter is in no way affected by vibration even if the splitter 20 is affected by vibration.

This embodiment in which the diffracted light is totally reflected is advantageous in that it utilizes the base as the waveguide path to take out the timing beam from a suitable location. The diffraction grating, if it is of the volume type, may be provided by using a sensitive material of the phase type and recording thereon interference fringes. The sensitive materials of the phase type include photopolymer, dichromated gelatin, etc.

In any of the foregoing embodiments, the diffraction grating is shown as one having conventional parallel grating lines, but where use is made of a holographic diffraction grating provided by recording interference fringes produced for planar surfaces and spherical surfaces, the diffraction grating may be provided with a condensing function.

In a holographic diffraction grating having a condensing function, the diffracted light 18 shown in FIG. 3 does not become a parallel beam, but a condensed beam and thus, the condenser lens 13 for timing, may be eliminated.

Figure 6:
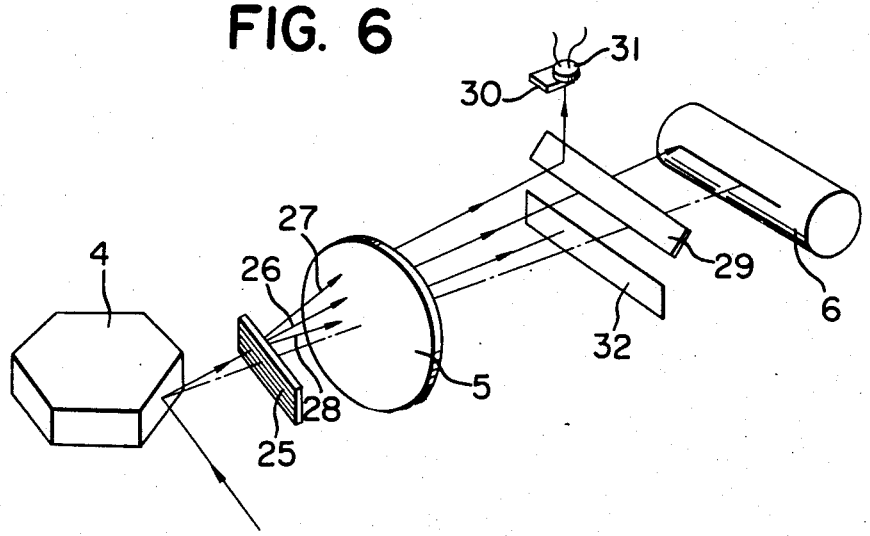
FIG. 6 shows an optical arrangement of the laser beam printer to which another embodiment of the synchronizing signal generator according to the present invention is applied.

The holographic diffraction grating having such a condensing function may be used also as a second diffraction grating 24 in the embodiment in FIG. 5. Reference will now be had to FIG. 6 to describe an embodiment in which a diffracting grating is disposed between a deflector and a focusing lens so that the direction of the grating lines is the scanning direction.

In this embodiment, the light beam reflected by the rotatable polygonal mirror 4 enters a diffraction grating 25 and the pitch of the diffraction grating vertically diffracted is so rough that non-diffracted light 26 and diffracted lights 27, 28 enter the focusing lens 5 when the angle of diffraction is less than the maximum angle of view of the lens. The incident non-diffracted light reaches the recording surface 6 to effect image recording. On the other hand, the diffracted light 27 is reflected by a mirror 29 and focused as a spot image on the surface of an overlying knife edge. A photoreception element 31 may be placed behind the knife edge to obtain a timing signal. The downwardly diffracted light 28 provides a harmful light during the image writing and should therefore be intercepted by an absorber 32.

Where the pitch of the diffraction grating is fine, timing may be provided by using another focusing lens 13 similar to that in the embodiment of FIG. 2.

The expansion of the angle of deflection will now be considered. In the FIG. 2 embodiment of the present invention in which the direction of the grating lines of the diffraction grating is orthogonal to the scanning line, the angle of diffraction $\beta$ was given by equation (1). From this equation (1), the variation $\Delta\beta$ in the angle of diffraction $\beta$ for the variation $\Delta\alpha$ in the angle of incidence $\alpha$ on the diffraction grating is obtained and may be given by $$\Delta\beta = \eta\Delta\alpha \tag{3}$$

where $\eta = \cos\alpha/\cos\beta$. In the plus primary diffracted light, $\beta > \alpha$ and thus, generally $\eta > 1$. That is, in the embodiment of FIG. 2, the angle of deflection of the light beam after diffracted is expanded. For example, the expansion rate $\eta$ of the deflection angle in the vicinity of $\beta = 60°$ and $\alpha = 15°$ becomes: $\eta = 1.93$, which means an expansion by about twice. The amount of displacement of the spot image on the image plane of the focusing lens 13 for timing is expanded by the amount of expansion. For this reason, as compared with the case that no diffraction grating is employed, the focal length of the focusing lens for timing may be made equal to $1/\eta$ to obtain the same timing accuracy, and the timing optical system may be made compact.

Description will now be made of the third object of the present invention which is a splitter by which the timing beam is split only when the beam is deflected to a timing angle.

Figure 7:
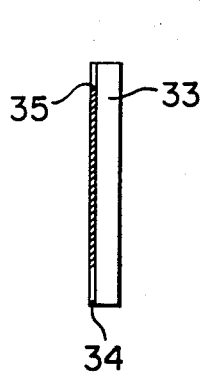
FIG. 7 shows a volume type diffraction grating.

A feature of the diffraction grating in which the grating lines 35 of the diffraction grating 34 formed on the diffraction grating base 33 as shown in FIG. 7 is that the diffraction efficiency thereof depends on the angle of incidence of the incident light beam. Especially, as the thickness of the diffraction grating 34 becomes greater, only the light beam incident on the vicinity of the angle called the Bragg angle of diffraction is diffracted and the light beam incident on the other angle passes through the diffraction grating without being diffracted. Therefore, if the Bragg diffraction angle is adjusted to the timing angle by the use of a volume type diffraction grating employed as the timing beam splitting diffraction grating used in the optical arrangement of the invention shown in FIG. 2, the light beam is split only when the light beam is deflected to the timing angle, and such split beam may be used as the timing light beam. In this embodiment, the timing angle $\alpha_T$ is set by the following equation:

$$\alpha_T \geq \text{\textcircled{H}} + \Delta\theta$$

where $\text{\textcircled{H}}$ is the maximum angle of deviation of the writing beam and $\Delta\theta$ is the angle range over which the diffraction efficiency in the vicinity of the Bragg diffraction angle of the diffraction grating exists. In the present invention, this angle range is referred to as the angle selection range. The difference between the timing angle $\alpha_T$ and the maximum deviation angle $\text{\textcircled{H}}$ of the writing beam, namely, the angle selection range $\Delta\theta$ should desirably be as small as possible. This is because the clock pulse number required before the writing instruction is given after the detection of timing signal can be reduced and the deflection range required of the deflector can also be reduced, whereby the diameter of the polygonal mirror deflector can be reduced.

Figure 8:
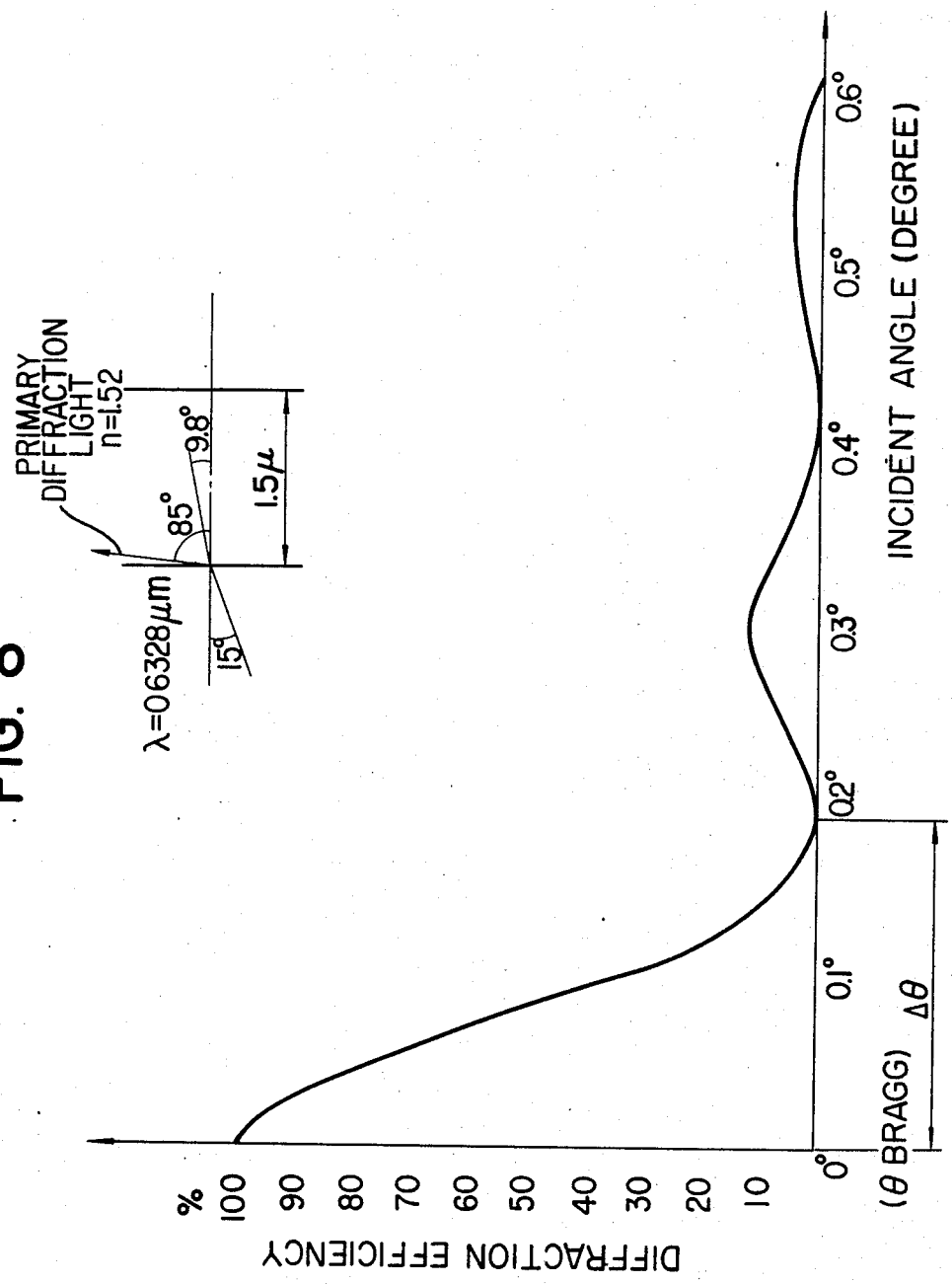
FIG. 8 illustrates the optical characteristic of the diffraction grating of FIG. 7.

An example of the angle selection characteristic of the volume type diffraction grating is shown in FIG. 8. This example shows the angle selection characteristic of the diffraction grating having a thickness of 15 $\mu$m and an average refractive index 1.52, and the Bragg angle is set such that a light beam incident at 15° is diffracted to the direction of 85°. In FIG. 8, the abscissa represents the angle of deviation from the Bragg incidence angle 15° and the ordinate represents the diffraction efficiency. In this instance, the angle selection range $\Delta\theta$ is about 0.2°.

If the holographic diffraction grating having the condensing function described with respect to the previous embodiment is employed as the volume type diffraction grating of the present embodiment, the timing optical system may be simplified as in the previous embodiment. The holographic diffraction grating having the condensing function is such that a beam splitter 41 splits in two the beam emitted from a laser 40 and one of the split beams is directed to a hologram sensitive material 44 through a mirror 42 and a condenser lens 43. In that case, a prism 46 is brought into intimate contact with the hologram sensitive material 44 by means of immersion liquid 45, so that the light beam 51 is directed from the end face 47 of the prism 46 to the hologram sensitive material 44. This hologram sensitive material includes a hologram sensitive layer and a base. The purpose of the prism 46 so provided is to expand as much as possible the incidence angle $\beta$ of the light beam 51 entering the hologram sensitive material 44, and a greater incidence angle results in a smaller angle selection range $\Delta\theta$ of the holographic diffraction grating. If the prism 46 was not provided but the light beam was caused to directly enter the hologram sensitive material, the incidence angle of the light beam would not exceed the critical angle $\theta_c$ of total reflection. Here, the critical angle $\theta_c$ is an angle given by the following equation:

$$\theta_c = \text{Sin}^{-1}(1/n)$$

where n is the refractive index of the hologram sensitive material. The refractive index of the immersion liquid 45 and of the prism 46 should desirably be approximate as much as possible to the refractive index of the hologram sensitive material 44, because in such case unnecessary reflected light can hardly occur between the underside of the prism 46 and the upper side of the hologram sensitive material 44. The hologram sensitive material available for use in the present embodiment may be photopolymer, DCG or the like. Where DCG is employed, the immersion liquid may be rose oil, caryophylic acid or the like. The other of the split beam is expanded and collimated by a mirror 47, a condensing lens 48 and a collimater lens 49, and enters the hologram sensitive material 44 through the upper side of the prism 46. If the wavelength of the laser during the formation of the hologram is equal to the wavelength of the deflected beam during the use of the holographic diffraction grating, the incidence angle $\alpha$ of the second beam 52 on the hologram sensitive material is set to an angle equal to the timing angle $\alpha_T$. Also, when the two wavelengths differ, the incidence angles $\alpha$ and $\beta$ of the beams 51 and 52 during the formation of the hologram must be corrected in advance such that the Bragg diffraction angle of the formed holographic diffraction grating becomes the timing angle $\alpha_T$. By having the interference fringes of the two beams 51 and 52 recorded on the hologram sensitive material, there is prepared the holographic diffraction grating having a condensing function. In order to prevent the two beams 51 and 52 from being reflected by the base surface the two beams 51 and 52 from being reflected by the base surface of the hologram sensitive material 44 to provide a harmful beam after having passed through the hologram sensitive material, an absorber 53 may preferably be brought into intimate contact with the hologram sensitive material 44 by means of immersion liquid 54.

Figure 9:
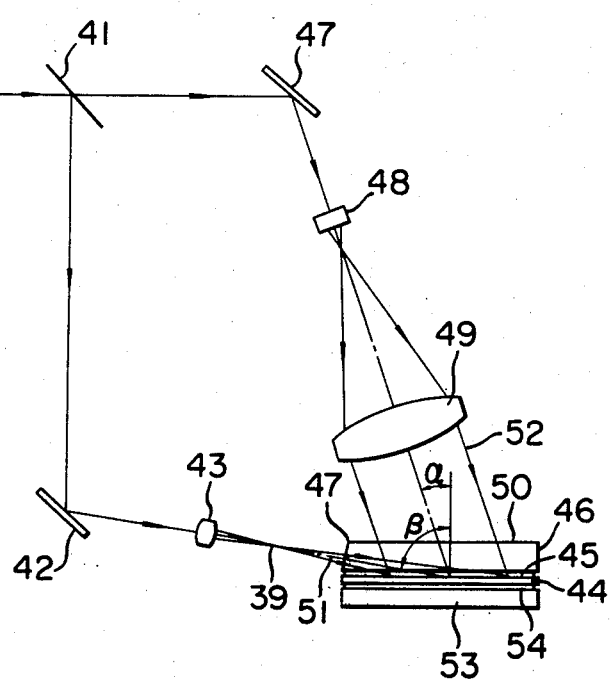
FIG. 9 illustrates the method of forming a convergent volume type diffraction grating.
Figure 10:
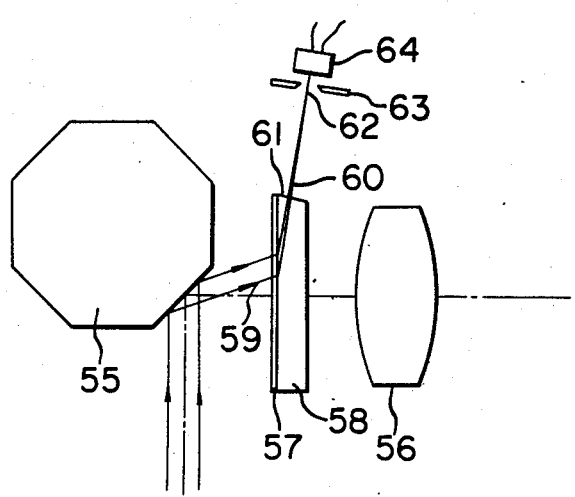
FIG. 10 illustrates the optical arrangement of the synchronizing signal generator using the diffraction grating formed by the method of FIG. 9.

In order that the condensing holographic diffraction grating formed with such an arrangement may be used as a timing beam splitter, the arrangement of FIG. 10 may be adopted. Disposed between the deflector 55 and the focusing lens 56 are the hologram 57 formed with the arrangement of FIG. 9 and a prism 58 adhesively secured to the hologram and similar in shape to that used during the formation of the hologram. The deflected beam 59 scans the hologram 57 and when the beam has attained just the timing angle $\alpha_T$, that beam reads the beam pre-recorded on the hologram and diffracts the beam 60. This beam 60 exists into the air from the inclined surface 61 of the prism 58 and when the wavelength of the beam during the formation of the hologram condensed at a point 62 is equal to the wavelength of the beam during reproduction, this condensing point is coincident with the condensing point 39 of the lens 43 during the formation of the hologram. Disposed behind the condensing point 62 are a slit opening 63 and a photoreception element 64 to enable a timing signal to be obtained.

Description will now be made of the fourth object of the present invention which is the simplification of the timing optical system by using a volume type hologram.

Figure 11:
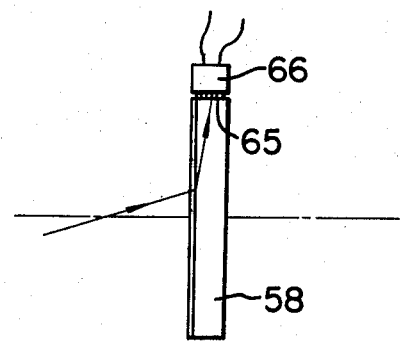
FIG. 11 illustrates a further different form of diffraction grating.

As shown in the previous embodiment, the volume type hologram has a selectivity for diffraction angle of the order of 0.2° even if the thickness of the hologram is of the order of 15 μm. Therefore, even if a photoreception element 66 is installed directly on the end face 65 in the manner as shown in FIG. 11, there is obtained a timing signal having the characteristic illustrated in FIG. 8. By detecting the peak position of the signal shown in FIG. 8, a timing signal may be obtained with an accuracy less than one or two places of the angle selection range.

What I claim:

1. A synchronizing signal generator comprising:
a light source means emitting a modulated light beam used for scanning;
a deflector for deflecting said modulated light beam in a predetermined direction;
a beam splitter consisting of a first diffraction grating which diffracts a portion of said modulated light beam deflected by said deflector and a base carrying thereon said diffraction grating;
a photodetector;
means for deriving a scan synchronizing signal from a synchronizing signal beam which is a portion of said diffracted beam; and
means for feeding scan signals synchronized with said synchronizing signal into said light source means.

2. A synchronizing signal generator according to claim 1, wherein the direction of the grating lines of said diffraction grating is substantially orthogonal to the direction of deflection of said deflected light beam, and the angle of direction of exit by said diffraction grating is greater than the angle of incidence of said light beam on said diffraction grating.

3. A synchronizing signal generator according to any of claim 1, wherein said beam splitter maintains the direction of exit from said beam splitter always in a predetermined relationship with the direction of entrance into said beam splitter of the light beam to be split.

4. A synchronizing signal generator according to claim 1, wherein said first diffraction grating is of the volume type.

5. A synchronizing signal generator according to claim 1, wherein said diffracted light beam is directed out of the deviation angle range necessary for scanning.

6. A synchronizing signal generator according to claim 1, wherein said diffracted light beam is reflected by the surface of said diffraction grating base therein.

7. A synchronizing signal generator according to claim 6, wherein said diffraction grating base has two parallel opposed surfaces and a second diffraction grating identical to the first one on a portion of the exit surface, and the synchronizing signal beam diffracted by said first diffraction grating on the incident surface is diffracted by said second diffraction grating after being reflected on said two parallel surfaces plural times in even number.

8. A synchronizing signal generator according to claim 1, wherein the direction of the grating lines of said first diffraction grating is substantially parallel to the direction of deflection of said deflected light beam.

9. A synchronizing signal generator according to claim 1, wherein said first diffraction grating is one having a condensing property.

10. A synchronizing signal generator according to claim 1, further comprising a focusing optical system for focusing said modulated light beam on a surface to be scanned.

11. A synchronizing signal generator comprising:
a light source for emitting a scanning light beam;
a deflector for deflecting said scanning light beam in a predetermined direction;
a beam splitter consisting of a first diffraction grating of volume type disposed within the deviation angle range of said scanning light beam and a base carrying thereon said volume type diffraction grating;
a photodetector;
means for deriving said diffracted light entering said photodetector to generate a synchronizing signal; whereby said beam splitter splits the scanning beam only when the deflected beam is deflected to the timing angle and said beam is entirely transparent for any other angle of deflection.

12. A synchronizing signal generator according to claim 11, wherein said diffracted light beam is directed out of the deviation angle range necessary for scanning.

13. A synchronizing signal generator according to claim 11, wherein said first diffraction grating of volume type and said base fulfill the condition given by $p \leq n\lambda$ where p represents the pitch of said first diffraction grating, n the refractive index of said base, λ the wavelength of said scanning light.

14. A synchronizing signal generator according to claim 13, wherein said diffraction grating base has two parallel opposed surfaces and the second diffraction grating identical to the first one on a portion of the exit surface, and the synchronizing signal beam diffracted by said first diffraction grating on the incident surface is diffracted by said second diffraction grating after being reflected on said two parallel surfaces plural times in even number.

15. A synchronizing signal generator according to claim 11, wherein said beam splitter maintains the direction of exit from said beam splitter always in a predetermined relationship with the direction of entrance into said beam splitter of the light beam to be split.

16. A synchronizing signal generator according to claim 11, wherein said first diffraction grating is one having a condensing property.

17. A synchronizing signal generator according to claim 11, further comprising a focusing optical system for focusing said scanning light beam on a surface to be scanned.

* * * * *

UNITED STATES PATENT AND TRADEMARK OFFICE
CERTIFICATE OF CORRECTION

PATENT NO. : 4,139,257
DATED : February 13, 1979
INVENTOR(S) : KAZUYA MATSUMOTO

It is certified that error appears in the above-identified patent and that said Letters Patent are hereby corrected as shown below:

On Title Page after "[22]" insert --[30] Foreign Priority

Japan      Sept. 28, 1976.....51-116264--.

Col. 7, lines 8-9 delete "the two beams 51 and 52.....base surface";

Col. 7, line 26 delete "exists" and insert --exits--.

Signed and Sealed this

Twenty-fourth Day of July 1979

[SEAL]

Attest:

LUTRELLE F. PARKER

Attesting Officer    Acting Commissioner of Patents and Trademarks